ELECTROMECHANICAL DELAY WITH CONTINUOUSLY ADJUSTABLE DELAY

Filed Aug. 6, 1971 2 Sheets-Sheet 1

Dec. 12, 1972 E. J. DIEULESAINT ET AL 3,706,055

ELECTROMECHANICAL DELAY WITH CONTINUOUSLY ADJUSTABLE DELAY

Filed Aug. 6, 1971 2 Sheets-Sheet 2

United States Patent Office 3,706,055
Patented Dec. 12, 1972

3,706,055
ELECTROMECHANICAL DELAY WITH CONTINUOUSLY ADJUSTABLE DELAY

Eugene Jean Dieulesaint and Pierre Hartman, Paris, France, assignors to Thomson-CSF Filed Aug. 6, 1971, Ser. No. 169,764
Claims priority, application France, Aug. 27, 1970, 7031300
Int. Cl. H03h 7/36, 9/30
U.S. Cl. 333—30 R 8 Claims

ABSTRACT OF THE DISCLOSURE

The present invention relates to continuously adjustable delay lines based upon propagation of a surface vibrational wave in a piezoelectric wave guide which is provided at its extremities with interdigitated comb-shaped electrodes.

The delay line in accordance with the invention comprises at least one comb structure the teeth of which are linked to a common connection by a semiconductor layer which is rendered locally conductive by means of a displaceable light spot.

This type of line can be utilised in a frequency range extending from one megacycle to several hundreds of megacycles, in order to produce delays adjustable from a fraction of a microsecond to several tens of microseconds.

The present invention relates to devices for delaying an electrical signal by a continuously adjustable time delay. It relates more particularly to delay lines in the form of a piezoelectric material at the surface of which comb-shaped interdigitated electrodes excite and pick up mechancal vibrations.

It is well known to produce surface wave delay lines by arranging adjacent to one another on a substrate, several sets of interdigitated comb-shaped conductive paths in order, through the medium of a selector switch, to achieve a delay time which can be modified step by step in discontinuous fashion. In order to obtain a continuous adjustment in delay, optical systems have been proposed which are capable of converting an ultrasonic wave propagated along a transperaent wave guide, into a delayed electrical signal. These optical systems are based upon phenomenon of scattering of light by ultrasonic waves; they are relatively delicate and expensive to manufacture.

According to the present invention, there is provided a delay line with a continuously adjustable delay comprising: a substrate of piezoelectric material having an upper face for propagating surface vibrational waves; a first arrangement of interdigitated comb-shaped electrodes deposited on said upper faces; a second arrangement deposited on said upper face, and including: a comb-shaped electrode, a plurality of intermediate fingers interdigitated with the fingers of said electrode, and a further electrode running at a distance from one end of said intermediate fingers; a layer of semiconductor material coupling said further electrode to said intermediate fingers; and means for rendering conducting a connecting portion of said layer.

For a better understanding of the invention, and to show how the same may be carried into effect, reference will be made to the ensuing description and the following figures among which:

Figure 1:
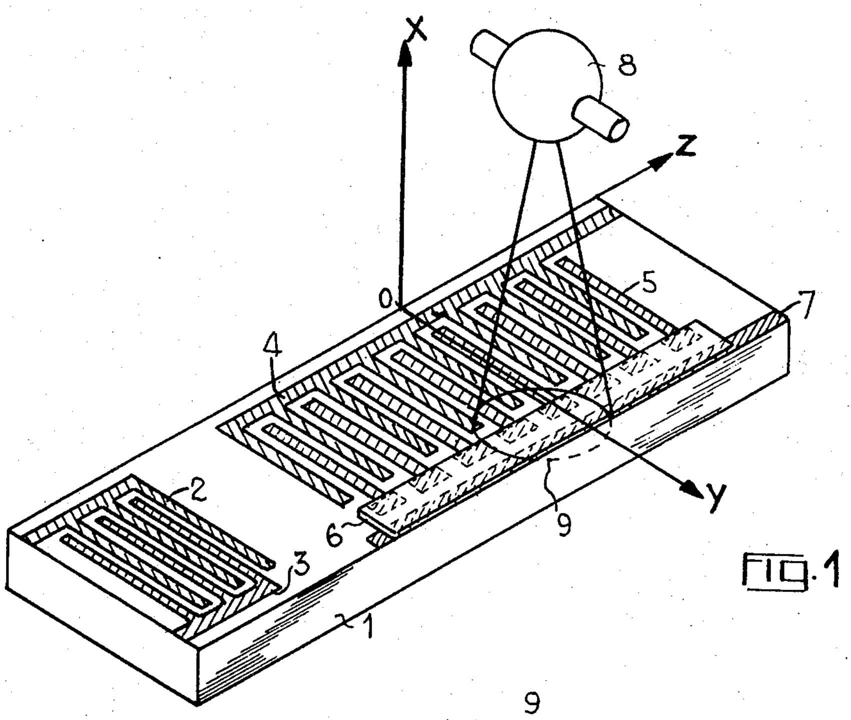
FIG. 1 is a perspective view of the delay line in accordance with the invention.

In FIG. 1, a wave guide 1 can be seen at the upper face of which there are deposited conductive electrodes 2, 3, 4, 5 and 7; a semiconductor layer 6 electrically links the electrodes 5 to the electrode 7. The electrodes 2 and 3 have the form of interdigitated comb-structures the teeth of which are disposed transversely in relation to the longitudinal axis Z of the substrate 1; the electrode 4 is similar to the electrode 2 and the electrodes 5 have the same disposition as the teeth of the comb structure 3, except that they are not electrically linked to one another. The device shown in FIG. 1 comprises a radiation source which emits towards the semiconductor layer 6; the emission from the source 8 takes the form of a beam 9 which intercepts a portion of the layer 6, rendering the irradiated zone conductive; by way of example, the source 8 may be a light source and the layer 6 a layer of cadmium sulphide (CdS). The source 8 can for example pivot about an axis parallel to OY in order that the conductive portion of the layer 6 can displace longitudinally. The longitudinal axis OZ corresponds to the direction of propagation of vibrational waves in the wave guide 1; the vibrational waves are excited when an alternating voltage is applied between the electrodes 2 and 3, since the material of which the wave guide is made is piezoelectric and is subject to the influence of the electric field whose lines of force terminate at the electrodes.

The waves excited by the structure 2, 3 will for example be Rayleigh waves; they propagate along the upper face of the wave guide 1 towards the electrodes 4, 5 where the mechanical vibrational energy is converted back to electrical energy. The electrode 7 is provided opposite the beam 9 with a conductor path which connects it with at least one of the electrodes 5; the other electrodes 5 remain disconnected from the electrode 7 since the semiconductor layer 6 has a high resistivity outside the illuminated zone.

The delay in the electrical signal produced by the electrodes 4 and 7, in relation to the electrical signal applied to the electrodes 2 and 3, depends upon the distance traversed by the surface vibrational wave between the teeth of the emitting comb structure and those of that portion of the receiving structure selected by the beam 9. When the light beam displaces over the layer 6, a pseudo-continuous variation in the delay time of the line is experienced; by utilizing comb teeth which are very closely spaced, it is possible to achieve virtually continuous variation in delay. The allumination of the layer 6 can simultaneously involve several teeth of the receiving comb in order to provide adequate impedance matching. It goes without saying that the beam 9 could be substituted by a mask containing a window moved parallel to the layer 6; the mask could then be illuminated over the whole of its area but only the light passing through the window would reach the layer 6.

Figure 4:
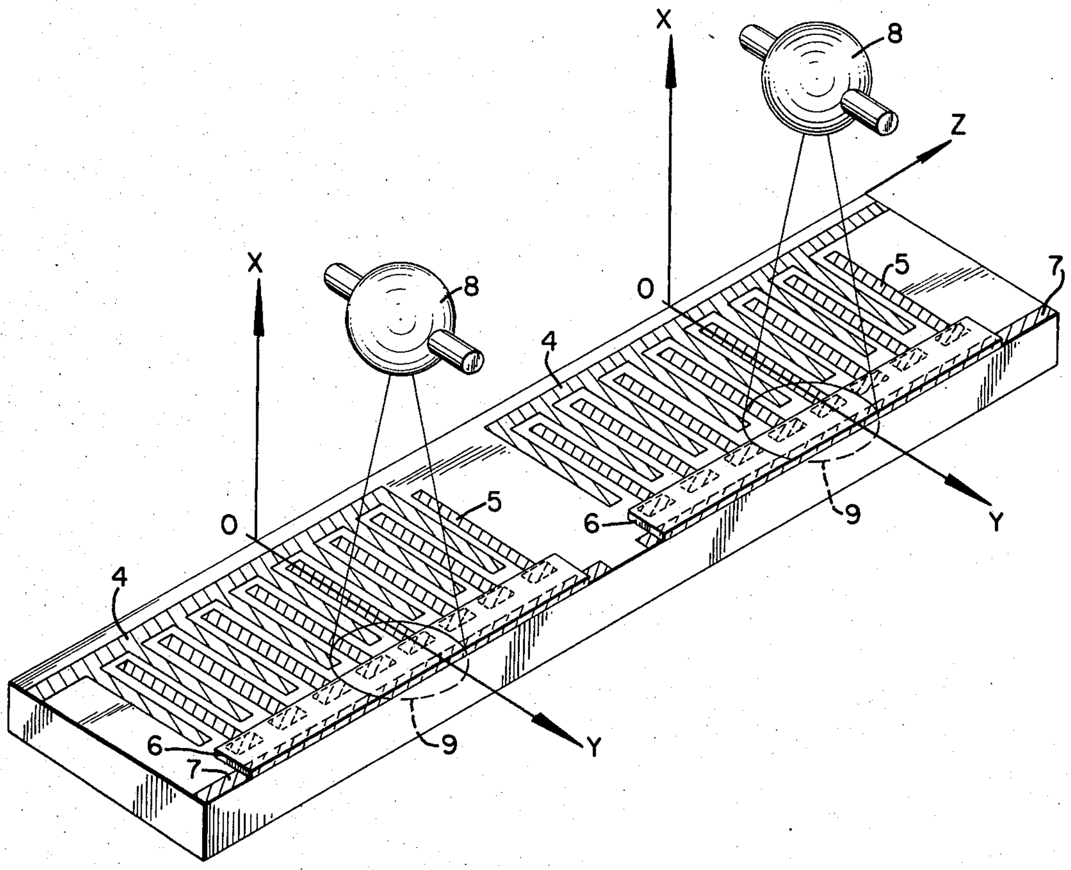
FIG. 4 is a partial perspective view of another embodiment of the invention.

It is likewise possible to reverse the roles of the components, by making the elements 4, 5 and 7 the emissive structure and the elements 3 and 4 the receiving structure. In addition, adjustment of the delay time can be achieved by arranging both at transmitting and receiving ends, interdigitated structures which each incorporate a semiconductor coupling layer for example as in FIG. 4.

Figure 2:
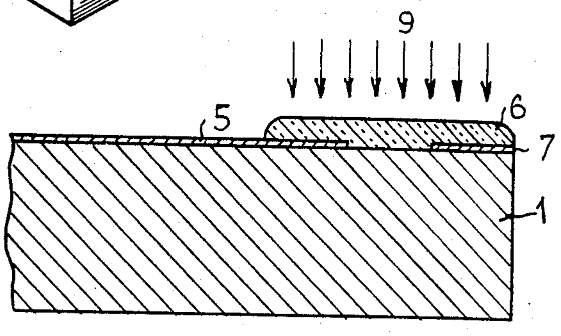
FIG. 2 is a transverse sectional view of the line of FIG. 1.

In FIG. 2, a cut along the plane XOY, through the delay line of FIG. 1, can be seen. The conductor fingers 5 and the bus bar electrode 7 are deposited upon the substrate 1 which propagates the surface waves; the semiconductor layer 6 partially covers the electrode 5, extends above the gap separating the two electrodes, and completely covers the electrode 7. The light beam 9 illuminates the top of the layer 6.

Under the action of the light, the resistivity of the layer 6 reduces considerably; however, the resistance measured between the electrodes 5 and 7 is not negligible since the cross-sectional area available for the current flow is relatively small and the length of the conductor path relatively long.

Figure 3:
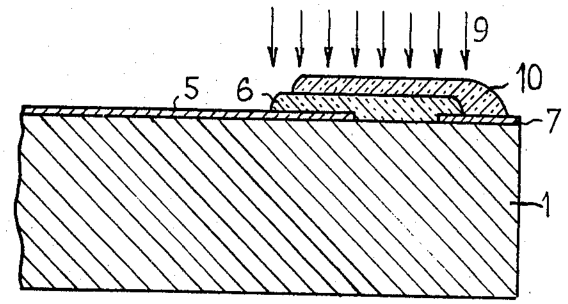
FIG. 3 illustrates a section through a variant embodiment of the delay line.

In situations where it is necessary to reduce this resistance, the configuration of FIG. 3 will be better than that of FIG. 2.

In FIG. 3, it can be seen that the semiconductor layer 6 is covered by a conductive layer 10 transparent to the light 9. The extremity of the layer 10 rests directly on the electrode 7 which is no longer completely covered by the layer 6. Thanks to this design, the chief resistance to current flow occurs between the transparent electrode 10 and the electrode 6; since this region has a large section and a small thickness, a low resistance is obtained in the conductive condition. By way of example, the layer 10 can be constituted by a deposit of tin oxide ($S_nO_2$).

What we claim is:

1. A delay line with a continuously adjustable delay comprising a substrate of piezoelectric material having an upper face for propagating surface vibrational waves;

a first arrangement of interdigitated comb-shaped electrodes deposited on said upper face;

a second arrangement deposited on said upper face and including: a comb-shaped electrode having a plurality of separated first fingers, a plurality of intermediate fingers interdigitated with said fingers of said comb-shaped electrode and a further electrode running at a distance from one end of said intermediate fingers;

a layer of semiconductor material coupling said further electrode to said intermediate fingers; and means for rendering conducting a connecting portion of said layer.

2. A delay line as claimed in claim 1, wherein said further electrode is substantially parallel to the direction of propagation of said surface waves; said intermediate fingers being substantially perpendicular to said direction.

3. A delay line as claimed in claim 1, wherein said means comprise a light source illuminating said connecting portion, and means for displacing said illuminated connecting portion along said layer.

4. A delay line as claimed in claim 1, further comprising a transparent conducting deposit overlaying said semiconductor layer; said deposit being in contact with said further electrode.

5. A delay line as claimed in claim 4, wherein said deposit is a deposit of tin oxide.

6. A delay line as claimed in claim 1, wherein said first arrangement builds up with said substrate an electromechanical transducer for exciting said surface waves.

7. A delay line as claimed in claim 1, wherein said first arrangement has the same structure as said second arrangement; each of said arrangements including a layer of semiconductor material, and means for rendering conducting a connecting portion of said layers.

8. A delay line as claimed in claim 1, wherein said semiconductor material is cadmium sulphide.

References Cited

UNITED STATES PATENTS

| | | | |
|---|---|---|---|
| 3,234,488 | 2/1966 | Fair | 333—30 R |
| 3,516,027 | 6/1970 | Wasilik | 333—30 R |
| 3,648,081 | 3/1972 | Lean et al. | 333—30 R X |
| 3,621,482 | 11/1971 | Adler | 333—30 R X |

PAUL L. GENSLER, Primary Examiner

U.S. Cl. X.R.

310—9.8